Parise & MacCord,
Molasses Pitcher,
Nº 50,620. Patented Oct. 24, 1865

Witnesses:

Inventors:

UNITED STATES PATENT OFFICE.

JOHN A. PARISE AND C. W. MacCORD, OF NEW YORK, N. Y.

MOLASSES-PITCHER.

Specification forming part of Letters Patent No. 50,620, dated October 24, 1865.

*To all whom it may concern:*

Be it known that we, JOHN A. PARISE and C. W. MACCORD, of the city of New York, in the county of New York and State of New York, have invented certain new and useful Improvements in Vessels for Containing Molasses, Viscid Oils, &c.; and we do hereby declare that the following is a full, clear, and exact description of the same, reference being had to the accompanying drawings, making a part of the same, in which—

Figure 2:
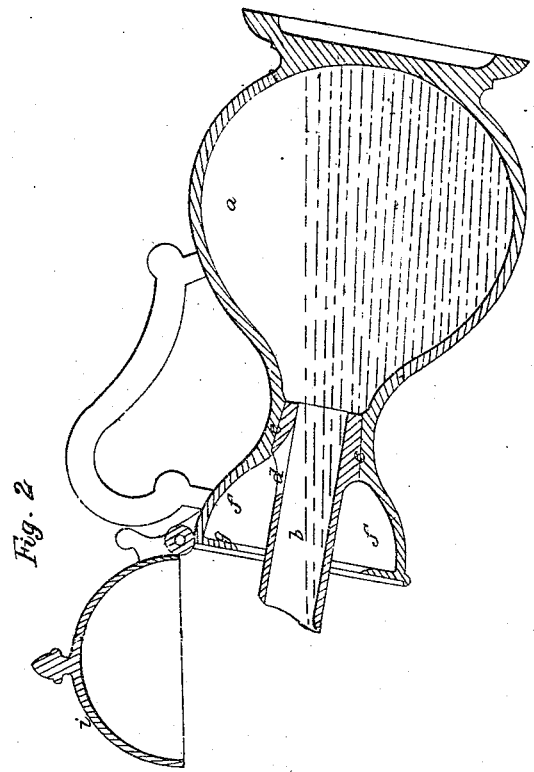
Figure 1:
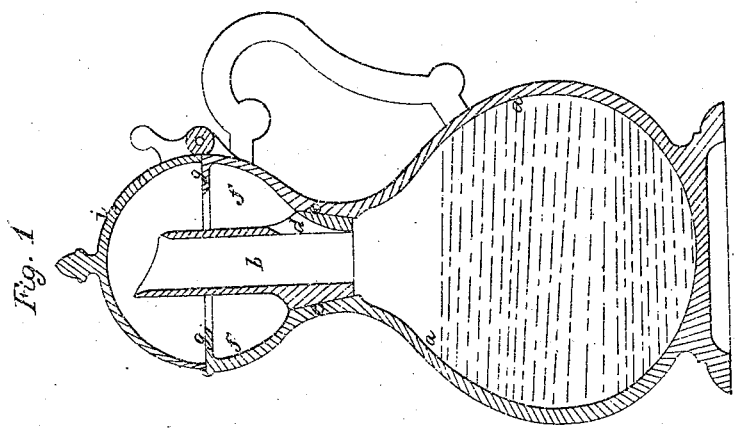

Figure 1 is a vertical section through the center of a molasses-jug, showing it in an upright position. Fig. 2 is a similar section of the same, showing it in position for pouring out the contents.

Like letters of reference will denote the same parts in both figures.

The object of this invention is to save or catch the drippings which always occur in pouring from vessels of ordinary construction for containing molasses or other viscid liquids, and to conduct them back to the interior of the vessel, thereby preventing the soiling of the exterior of the vessel or of the table upon which it is used.

To enable others to make and use our invention, we will proceed to describe it with reference to the drawings.

The pitcher or vessel $a$, of earthenware, metal, or any other suitable material, has its main chamber or body which contains the liquid of any suitable form, with a contracted neck, $e$, and a funnel-shaped mouth, $f$, above, and may be fitted with a hinged cover, $i$. Into the neck there is inserted centrally and tightly a pouring-spout, $b$, of the same or similar material, which is upright when it stands on its bottom, and which may be made of a separate piece from the vessel and fitted in such manner as to be capable of easy removal for filling the vessel or cleaning it. The lip of this spout is considerably higher than the mouth of the vessel, so that the liquid may be poured over the edge of the mouth, as shown in Fig. 2, when the vessel is held in a slanting position. In the back of the said spout, just above the neck $e$, there is an opening, $d$. The upper edge of the funnel-shaped mouth has an internally-projecting flange, $g$, all around it.

The operation is as follows: In pouring, the liquid flows out through the spout $b$, as shown in Fig. 2, and when the vessel has been set down again on its bottom any of the liquid which may have run over the lip of the spout will run down the exterior of the latter and be collected in the lower part of the funnel-shaped mouth, or, as it may be termed, the "overflow-receiver," whence it runs back through the spring $d$ and lower part of the neck to the interior of the vessel $a$.

It will be understood from the foregoing description that no liquid can drop or run down from the spout onto the exterior of the vessel.

In case of the pouring and subsequent setting down of the vessel on its bottom being so frequently and rapidly repeated that the liquid cannot run back through the opening $d$ as fast as it is collected in the overflow-receiver $f$, any liquid that remains in the overflow-receiver will be prevented from overflowing the said receiver or mouth of the vessel by means of the internally-projecting flange $g$, which thus constitutes an important feature of the invention.

What we claim as our invention, and desire to secure by Letters Patent, is—

1. The central pouring-spout, $b$, fitted into the neck of the vessel, surrounded by a funnel-shaped or enlarged mouth or overflow-receiver $f$, and having an opening, $d$, for the return of the overflow to the vessel, substantially as and for the purpose herein set forth.

2. The internal flange, $g$, around the mouth or overflow-receiver $f$, in combination with the central pouring-spout, $b$, substantially as and for the purpose herein specified.

JOHN A. PARISE.
C. W. MACCORD.

Witnesses:
J. W. COOMBS,
G. W. REED.